US012706037B2

(12) United States Patent
Lee

(10) Patent No.: US 12,706,037 B2

(45) Date of Patent: Aug. 11, 2026

(54) DISPLAY DEVICE AND IMAGE DISPLAY METHOD OF DISPLAY DEVICE

(71) Applicant: LG Display Co., Ltd., Seoul (KR)

(72) Inventor: ByoungGwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/941,650

(22) Filed: Nov. 8, 2024

(65) Prior Publication Data

US 2025/0273137 A1 Aug. 28, 2025

(30) Foreign Application Priority Data

Feb. 26, 2024 (KR) ........................ 10-2024-0027107

(51) Int. Cl.

*G09G 3/3225* (2016.01)
*G06F 3/01* (2006.01)
*G09G 3/00* (2006.01)

(52) U.S. Cl.

CPC ........... *G09G 3/3225* (2013.01); *G06F 3/012* (2013.01); *G06F 3/013* (2013.01); *G09G 3/001* (2013.01); *G09G 2300/0852* (2013.01); *G09G 2310/04* (2013.01); *G09G 2320/0261* (2013.01); *G09G 2320/0686* (2013.01); *G09G 2330/021* (2013.01); *G09G 2354/00* (2013.01)

(58) Field of Classification Search

None

See application file for complete search history.

(56) References Cited

U.S. PATENT DOCUMENTS

2019/0005884 A1* 1/2019 Yoo ...................... G09G 3/3266

* cited by examiner

*Primary Examiner* — Ifedayo B Iluyomade

(74) *Attorney, Agent, or Firm* — Seed Intellectual Property Law Group LLP

(57) ABSTRACT

A display device according to an embodiment of the disclosure may comprise a display panel displaying an input image on a screen, a user gaze determiner determining a user gaze on the display panel based on a sensor value obtained from a motion sensor, an area divider dividing the display panel into the user's main field-of-view area, peripheral field-of-view area, and outer area based on the determined user gaze, a scan time determiner determining scan times of scan signals corresponding to the main field-of-view area and the peripheral field-of-view area, and a data driver applying a data voltage to the display panel according to the determined scan time.

19 Claims, 11 Drawing Sheets

DISPLAY DEVICE AND IMAGE DISPLAY METHOD OF DISPLAY DEVICE

CROSS-REFERENCE TO RELATED APPLICATION

This application claims priority from Korean Patent Application No. 10-2024-0027107, filed on Feb. 26, 2024, which is hereby incorporated by reference for all purposes as if fully set forth herein.

BACKGROUND

Technical Field

The disclosure relates to a display device and an image display method of the display device.

Description of the Related Art

Virtual reality technology is advancing most rapidly in the fields of defense, architecture, tourism, movies, multimedia, and games. Virtual reality refers to a specific environment or situation that feels similar to the real environment through stereoscopic imaging technology.

A virtual reality (hereinafter referred to as “VR”) system moves a three-dimensional (3D) image and outputs 3D sound according to the user’s movement, providing a virtual experience to the user. VR systems are implemented in the form of head mounted display (HMD) and face mounted display (FMD).

Augmented reality (AR) systems superimpose digital content on the real world. The augmented reality system is implemented in the form of eye glasses-type display (EGD).

To increase user immersion in a virtual reality system or augmented reality system and reduce motion sickness or blur due to inconsistency between the user’s movement and the movement on the screen, the display device are driven at high speed.

In conventional VR/XR devices, the display device is driven at a fixed frame per second (FPS), and attempts are being made to continuously increase the FPS to reduce motion sickness or motion blur.

However, if the display device is driven at high speed (e.g., 120 Hz) regardless of the user’s movement, difficulty in implementation (e.g., physical RC delay) and excessive power consumption occur.

BRIEF SUMMARY

The disclosure relates to a display device and an image display method of the display device, which may reduce power consumption in the display panel even when outputting, on the display panel, real-time processed image data in conjunction with the user’s movement in a VR/AR system.

A display device according to an embodiment of the disclosure may comprise a display panel displaying an input image on a screen, a user gaze determiner determining a user gaze on the display panel based on a sensor value obtained from a motion sensor, an area divider dividing the display panel into the user’s main field-of-view area, peripheral field-of-view area, and outer area based on the determined user gaze, a scan time determiner determining scan times of scan signals corresponding to the main field-of-view area and the peripheral field-of-view area, and a display controller applying a data voltage to the display panel according to the determined scan time.

An image display method of a display device according to an embodiment of the disclosure may comprise receiving a sensor value detecting a user movement from a motion sensor, determining a user gaze on a display panel based on the sensor value, dividing the display panel into the user’s main field-of-view area, peripheral field-of-view area, and outer area based on the determined user gaze, determining scan times of scan signals corresponding to the main field-of-view area and the peripheral field-of-view area, and applying a data voltage to the display panel according to the determined scan times.

Although the disclosure has been shown and described in connection with exemplary embodiments thereof, it will be appreciated by one of ordinary skill in the art that various changes or modifications may be made thereto without departing from the scope of the disclosure.

According to an embodiment of the disclosure, it is possible to display an image on the screen by real-time reflecting the movement of the user’s gaze by determining user gaze information according to user movement information obtained from a motion sensor.

In other words, the disclosure may divide the display into a main field-of-view area and a peripheral field-of-view area and determine different scan times for the scan signals corresponding to the main field-of-view area and the peripheral field-of-view area, thereby reducing power consumption of the display panel as compared with when driving at a uniform scan time of the front surface of the display panel.

Further, according to an embodiment of the disclosure, it is possible to reduce motion sickness which is inconvenience due to a mismatch between the user’s movement in the virtual environment and the real movement by outputting image data in the main field-of-view area and the peripheral field-of-view area of the display panel at different speeds.

The effects of the disclosure are not limited thereto, and the disclosure encompass other various effects.

BRIEF DESCRIPTION OF THE SEVERAL VIEWS OF THE DRAWINGS

The above and other objects, features, and advantages of the disclosure will be more clearly understood from the following detailed description, taken in conjunction with the accompanying drawings, in which.

DETAILED DESCRIPTION

Figure 1:
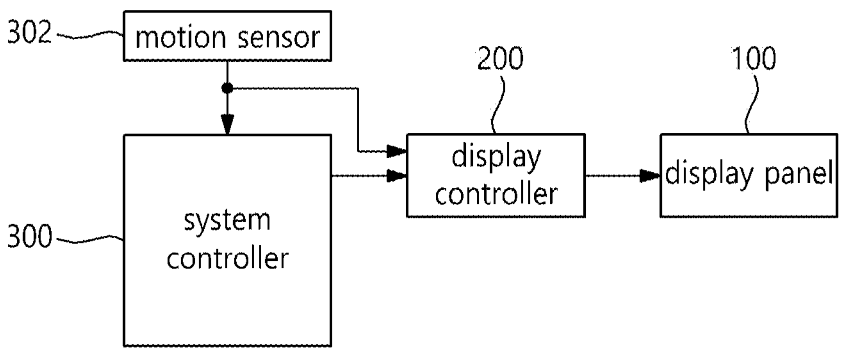
FIG. 1 is a block diagram illustrating a display device according to an embodiment of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

The display device according to the disclosure may be applied to a system for updating a scan time of a scan signal based on a user's gaze estimated according to the user's movement, such as a VR system and an AR system. The display device according to the disclosure may be implemented as a flat panel display device such as a liquid crystal display (LCD), an organic light emitting display (OLED display), or the like.

Figure 5:
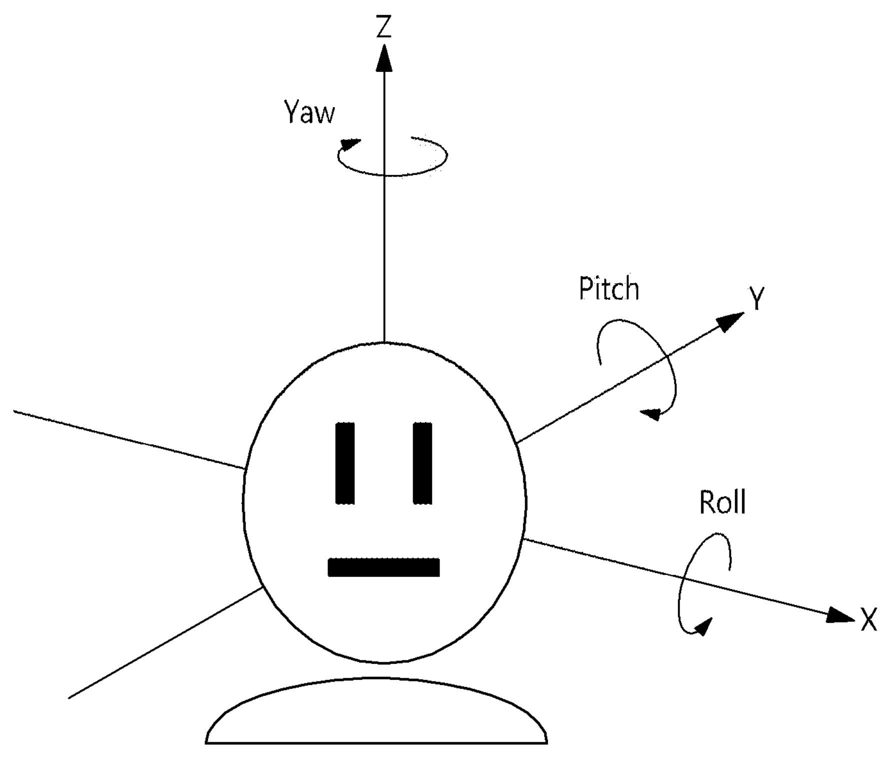
FIG. 5 is a view illustrating a pitch, yaw, and roll when a user’s head rotates on three axes X, Y, and Z.

The VR/AR system may estimate the user's field-of-view information according to the user's movement using the motion sensor, and update the scan time of the scan signal corresponding to the image data to be reproduced in the display device according to the user's moving field-of-view. In an embodiment, the motion sensor may provide pitch, yaw, and roll information as illustrated in FIG. 5 as angle values. The motion sensor may include one or more of an angular velocity sensor "gyro sensor" (or "gyroscope") or an acceleration sensor (or "accelerometer"). The motion sensor also may include a ranging sensor.

The image display method of the display device according to the disclosure may include receiving a sensor value of detecting a user movement from the motion sensor, determining a user gaze on the display panel based on the sensor value, and dividing the display panel into the user's main field-of-view area and a peripheral field-of-view area based on the determined user gaze. An image is displayed on the display device by determining scan times of scan signals corresponding to the main field-of-view area and the peripheral field-of-view area, and applying a data voltage to the display panel according to the determined scan time.

AR/VR devices are manufactured in the form of HMD, FMD, and EMG. When the user wears a VR/AR device and reproduces VR/AR content while wearing a VR/AR device, if the user's head moves, the image on the display screen is moved in a direction opposite to the user's movement. The motion sensor may output the motion information about the user as an angle value when the user moves.

The display device according to the disclosure detects the user's movement based on the angle value information output from the motion sensor, and changes the scan time based on the user gaze estimated based on the user's movement, and reflect the main field-of-view according to the user's movement, e.g., eye movement, on the display screen in real time. The eye movement can be determined based on one or more of head movement, body movement, or eye ball movement of the user, or other sensing or detection approaches, which are all included in the disclosure.

Hereinafter, various embodiments of the disclosure are described in detail with reference to the accompanying drawings.

Figure 2:
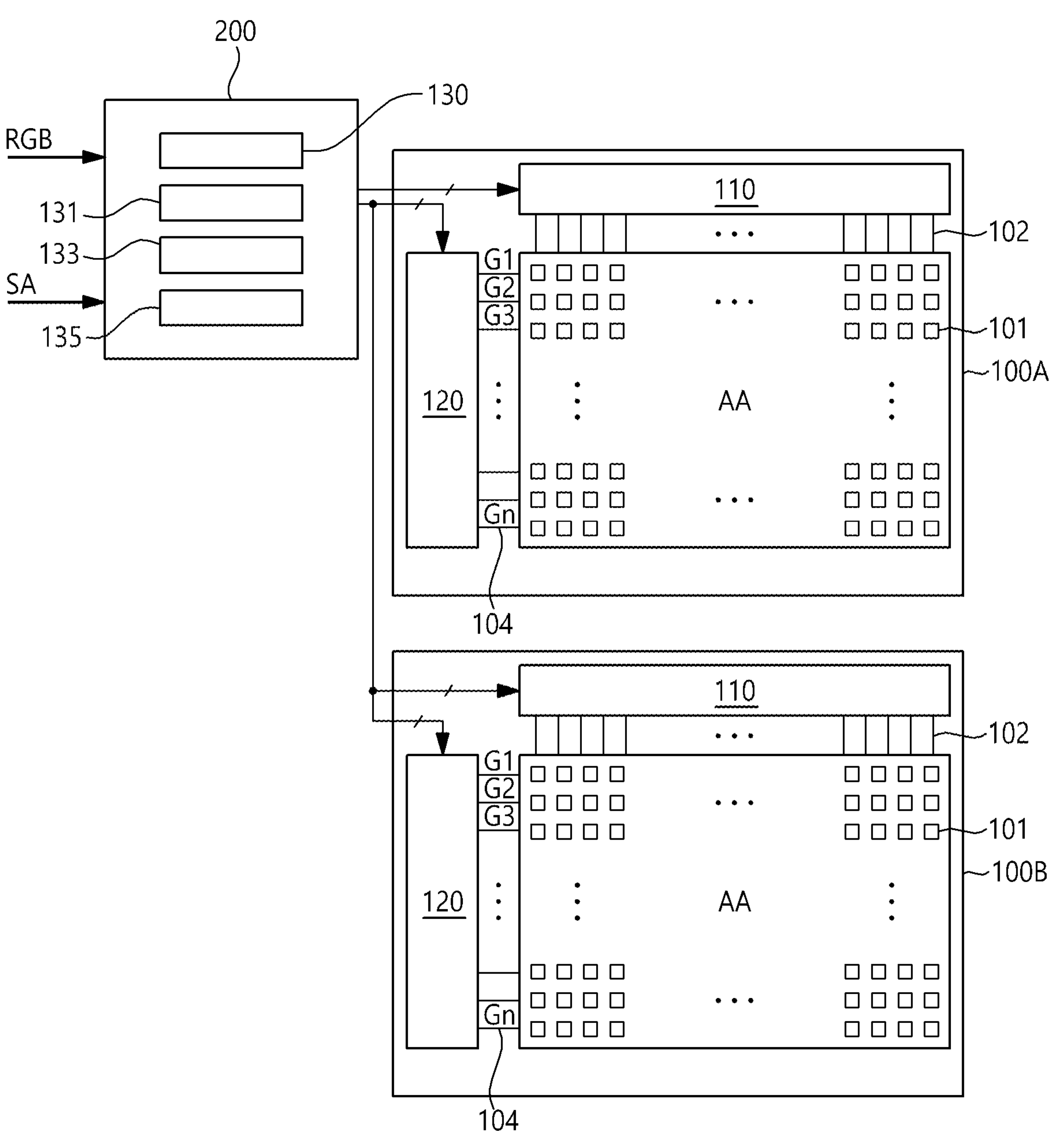
FIG. 2 is a plan view illustrating, in detail, the display driving unit and display panel of FIG. 1.

FIG. 1 is a block diagram illustrating a display device according to an embodiment of the disclosure. FIG. 2 is a plan view illustrating, in detail, the display driving unit and display panel of FIG. 1.

Referring to FIGS. 1 and 2, the display device according to the disclosure includes a display panel 100, 100A, 100B, a system controller 300, a display controller 200, and the like.

The system control unit 300 may be an AR/VR system, but is not limited thereto. For example, the system controller 300 may be any one of a television (TV) system, a computer system, a set-top box, a navigation system, a DVD player, a Blu-ray player, a home theater system, a mobile device system, and a wearable device system.

The system controller 300 is connected to the motion sensor 302, a camera, and the like. The system controller 300 may further include an external device interface connected to a memory or an external video source, a user interface for receiving user commands, and a power supply for generating power. The external device interface, the user interface, and the power supply are omitted from the drawings. The external device interface may be implemented as various known interface modules such as universal serial bus (USB) and high definition multimedia interface (HDMI).

The system controller 300 may include a display controller 200 that performs image processing of the input image.

The display controller 200 converts the resolution of the input image according to the resolution of the display panel 100, 100A, 100B.

The display controller 200 may analyze a sensor value obtained from the motion sensor 302 using a preconfigured user motion algorithm to estimate the area to which the user gaze is directed, divide the display panel into the user's main field-of-view area and peripheral field-of-view area based on the user gaze, adaptively vary scan times of scan signals corresponding to the main field-of-view area and the peripheral field-of-view area, and apply a data voltage to the display panel according to the determined scan time.

The display panel 100 may be implemented as a display panel on which an image is displayed in a flat panel display device such as a liquid crystal display (LCD), a field emission display (FED), and an electroluminescence display. The electroluminescence display may be divided into an inorganic light emitting display device and an organic light emitting display device according to the material of the light emitting layer. An example of the inorganic light emitting display device is a quantum dot display device.

The pixel array of the display panel 100 implements a display screen AA on which an input image is reproduced. The pixel array includes data lines 102 to which a data voltage is applied, gate lines (or scan lines 104) to which a gate pulse (or scan pulse) is applied, and pixels arranged in a matrix form by an orthogonal structure of the data lines 102 and the gate lines 104 and electrically connected to the data lines and the gate lines 104.

Each of the pixels is divided into a red subpixel 101, a green subpixel 101, and a blue subpixel 101 to implement a color. Each of the pixels may further include a white subpixel 101.

Each of the subpixels may include one or more thin film transistors (TFTs).

In the VR/AR system, the display panel 100 may be divided into a first display panel 100A on which left-eye image data is displayed and a second display panel 100B on which right-eye image data is displayed, as illustrated in FIG. 2.

The display controller 200 may determine a user gaze on the display panel 100 in response to the output SA of the motion sensor 302, divide the display panel 100 into the user's main field-of-view area and peripheral field-of-view area based on the determined user gaze, determine scan times of scan signals corresponding to the main field-of-view area and the peripheral field-of-view area, and apply a data voltage to the display panel 100 according to the determined scan time to reflect the user gaze on the display screen in real time.

The image data output by the timing controller 130 is transmitted to the data driver 110.

The timing controller 130 receives timing signals synchronized with the input image data from the system controller 300, and controls the operation timings of the data driver 110 and the gate driver 120 based on the timing signals.

The display controller 200 may divide the display panel 100 into a main field-of-view area and a peripheral field-of-view area based on the position information about the focal area.

The display controller 200 writes the image data received from the system controller 300 to the pixels of the display panel 100. The display controller 200 includes the timing controller 130, the data driver 110, the gate driver 120, and the like illustrated in FIG. 2.

In the case of a virtual reality (VR) device, the display controller 200 may divide the main field-of-view area and the peripheral field-of-view area on the screen of each of the display panels 100A and 100B, and determine the scan time corresponding to the image data received from the system controller 300 to be different according to the field-of-view area and the peripheral field-of-view area. According to an embodiment, the display controller 200 may reduce the scan time of the scan signal applied to the gate lines GL in the peripheral field-of-view area as compared with the scan time of the scan signal applied to the gate lines GL in the main field-of-view area.

The display controller 200 writes data of the input image to the display panels 100A and 100B. The display controller 200 includes a data driver 110, a gate driver 120, and a timing controller 130 in each of the display panels 100A and 100B. The data drivers 110 of the display panels 100A and 100B may share one timing controller 130.

The data driver 110 generates a voltage (data voltage) of an analog data signal by converting the data of the input image received from the timing controller 130 into a gamma compensation voltage, and outputs the data voltage to the data lines 102. The gate driver 120 outputs a gate signal (or a scan signal) synchronized with the data voltage to the gate lines 104.

The gate driver 120 includes a shift register for sequentially supplying the gate signal to the gate lines by shifting the pulse of the gate signal. The gate driver 120 shifts the gate signal output to the gate lines 104 under the control of the timing controller 130.

The input terminal of the timing controller 130 is connected to the system controller 300 and the motion sensor 302. The output terminal of the timing controller 130 is connected to the data driver 110 and the gate driver 120.

The timing controller 130 may include a user gaze determiner 131, an area divider 133, and a scan time determiner 135. Alternatively, the user gaze determiner 131, the area divider 133, and the scan time determiner 135 may be separately provided outside the timing controller 130.

The user gaze determiner 131 may determine the user gaze on the display panel 100 based on the sensor value obtained from the motion sensor.

The area divider 133 may divide the display panel 100 into the user's main field-of-view area and peripheral field-of-view area based on the determined user gaze.

The scan time determiner 135 may determine scan times of scan signals corresponding to the field-of-view area and the peripheral field-of-view area.

Figure 6:
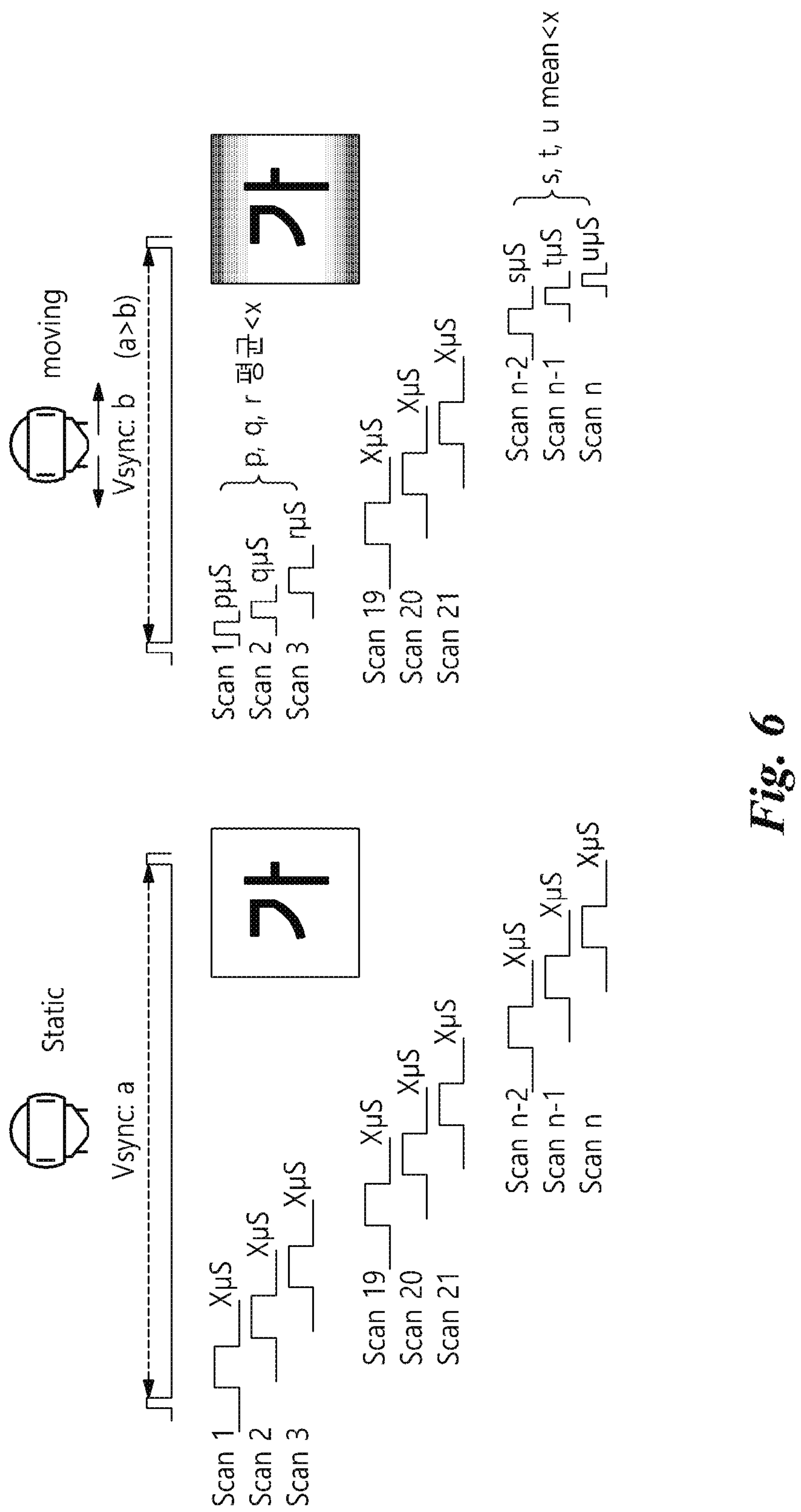
FIG. 6 is a view illustrating an example of determining user gaze information according to user movement information obtained from a motion sensor and reflecting a movement of the user’s gaze to a scan time according to an embodiment of the disclosure.

FIG. 6 is a view illustrating an example of determining user gaze information according to user movement information obtained from a motion sensor and reflecting a movement of the user's gaze to a scan time according to an embodiment of the disclosure.

As illustrated on the left side (static) of FIG. 6, when it is determined that the user's gaze does not move for a predetermined threshold time or more, the scan time determiner 135 may determine that the scan time at which the scan signals Scan1 to Scan n to be input to all of the gate lines disposed on the display panel 100 are turned on is a, e.g., same, preset fixed time xμs. Here, xμs may correspond to, e.g., a scan time of a scan signal generally set in a display device of 120 Hz.

As shown on the right side (moving) of FIG. 6, the scan time determiner 135 may determine the scan time corresponding to the main field-of-view area and the scan time corresponding to the peripheral field-of-view area to differ from each other.

For example, the scan time determiner 135 may determine the scan time corresponding to the main field-of-view area to be longer than the scan time corresponding to the peripheral field-of-view area.

In other words, by continuing the scan signal of the turn-on level to the gate line GL corresponding to the main field-of-view area of the display panel 100 with a sufficient scan time t1, the data voltage may be sufficiently charged to the storage capacitor Cst, so that a portion of the display panel 100 corresponding to the main field-of-view may emit light with high luminance.

In this case, for the gate line GL corresponding to the peripheral field-of-view area, the scan signal of the turn-on level may be set to a scan time t2 shorter than t1, so that another portion of the touch panel 100 corresponding to the peripheral field-of-view, other than the user's main field-of-view area, may emit light with a relatively lower luminance than the display panel 100 corresponding to the main field-of-view area. Here, the scan time determiner 135 may gradually reduce the scan times of the scan signals corresponding to the peripheral field-of-view area as the distance from the main field-of-view area increases. This is to linearly reduce scan times corresponding to the peripheral field-of-view area so as not to be recognized by the user gaze. This is because, when the scan times of the scan signal corresponding to the peripheral field-of-view area are drastically reduced, there is a risk that the image may appear to have a step in the user's field-of-view. For example, among two subpixels in the peripheral field-of-view area, the one further from the main field-of-view area will have a lower luminance level.

The mean of the scan times of the scan signals corresponding to the peripheral field-of-view area may be smaller than the scan time of the main field-of-view area.

Figure 3:
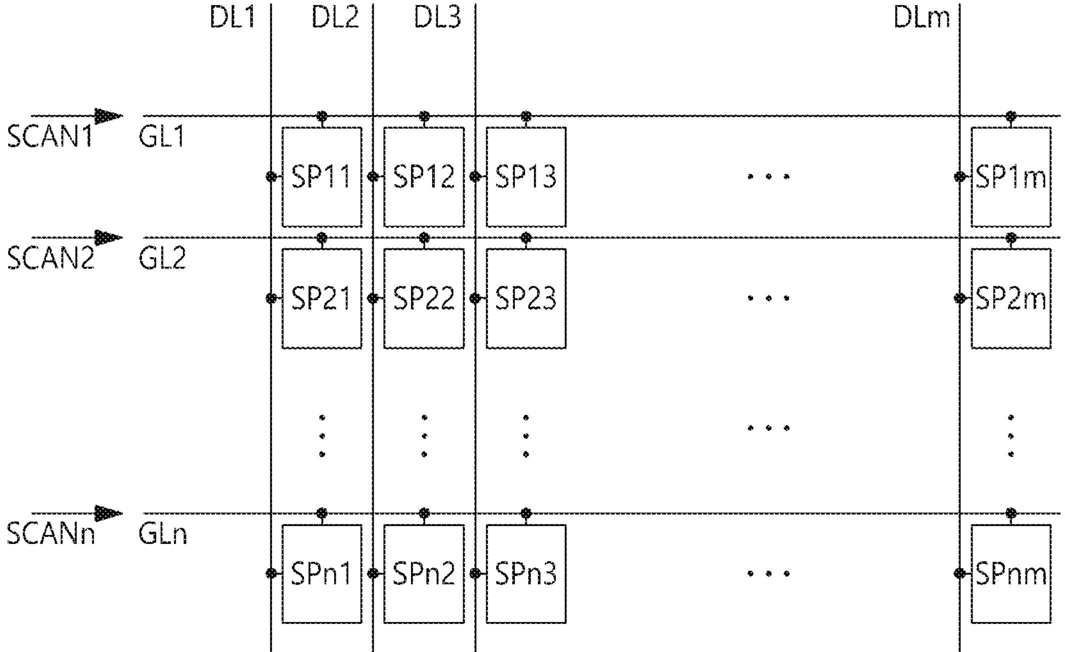
FIG. 3 is a plan view schematically illustrating an organic light emitting display panel 100 according to an embodiment of the disclosure.
Figure 4:
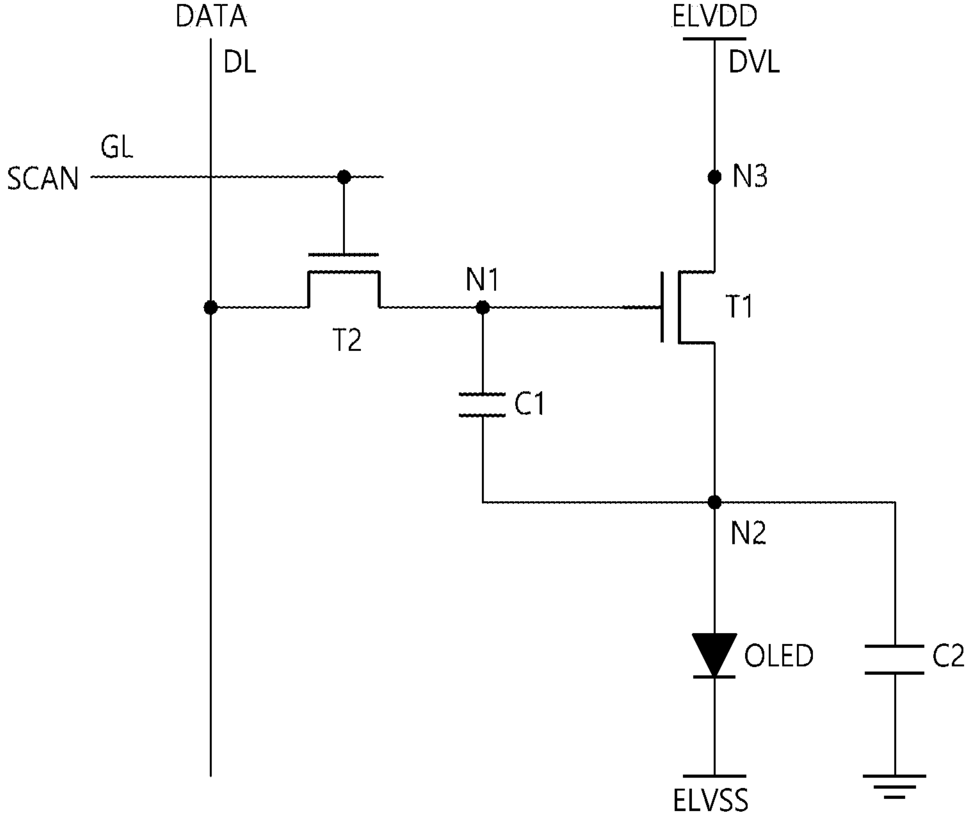
FIG. 4 illustrates example structures of subpixels SP arranged on a display panel 100 when the display panel is an organic light emitting display panel.

FIG. 3 is a plan view schematically illustrating an organic light emitting display panel 100 according to an embodiment of the disclosure. FIG. 4 illustrates example structures of subpixels SP arranged on a display panel 100 when the display panel is an organic light emitting display panel.

Referring to FIG. 3, an organic light emitting display panel 100 in which subpixels are disposed is illustrated, and each subpixel receives a scan signal SCAN from one gate line GL.

Referring to FIG. 4, each of a plurality of subpixels SP may include an organic light emitting diode OLED, a first transistor T1 for driving the organic light emitting diode OLED, a second transistor T2 for transferring a data voltage Vdata to a first node N1 which is the gate node of the first transistor T1, and a storage capacitor Cst for maintaining a voltage during one frame period.

The organic light emitting diode OLED may include a first electrode, an organic light emitting layer, and a second electrode. The first electrode may be an anode electrode. The second electrode may be a cathode electrode to which a cathode voltage EVSS is applied. In some cases, the first electrode may be the cathode electrode, and the second electrode may be the anode electrode. The first transistor T1 may be electrically connected between the first electrode of the organic light emitting diode OLED and the driving voltage line DVL.

In the first transistor T1, the first node N1 is the gate node, and may be electrically connected to the source node or the drain node of the second transistor T2 and receive the data voltage Vdata. The second node N2 is the source node or the drain node and may be electrically connected to the first electrode of the organic light emitting diode OLED. The third node N3 may be electrically connected to the driving voltage line DVL. The second transistor T2 may be controlled by a first scan signal SCAN1 supplied through the gate line GL and be electrically connected between the gate node N1 of the first transistor T1 and the data line DL. The second transistor T2 may be turned on to apply the data voltage Vdata supplied to the data line DL to the first node N1 which is the gate node of the first transistor T1. The storage capacitor Cst may be electrically connected between the first node N1 and second node N2 of the first transistor T1. The plurality of lines SL arranged on the display panel 110 may include a data line DL, a driving voltage line DVL, and a gate line GL. Here, one or more of the data line DL, driving voltage line DVL, and gate line GL may be a stretchable line SL. Each subpixel SP in the display panel 110 may have a 2T (transistor) 1C (capacitor) structure including two transistors T1 and T2 and one capacitor Cst. Each subpixel SP in the display panel 110 may further include one or more transistors or may further include one or more capacitors.

For example, as illustrated in FIG. 4, each subpixel SP may be controlled by a second scan signal SCAN2 and may further include a second transistor T2 electrically connected between the second node N2 of the first transistor T1 and the reference voltage line RVL.

FIGS. 7A to 7D are views illustrating examples of determining user gaze information according to user movement information obtained from a motion sensor and reflecting a movement of the user's gaze to a scan time according to an embodiment of the disclosure.

Figure 7A:
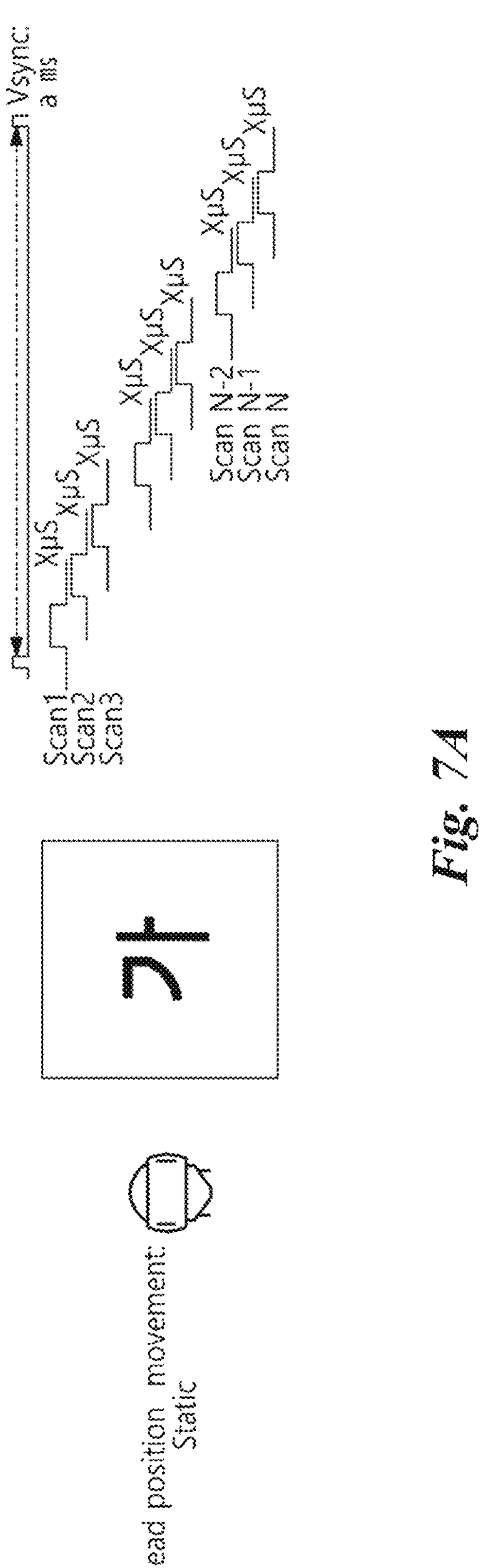
FIGS. 7A to 7D are views illustrating examples of determining user gaze information according to user movement information obtained from a motion sensor and reflecting a movement of the user’s gaze to a scan time according to an embodiment of the disclosure.

Referring to FIG. 7A, when it is determined by the user gaze determiner 131 that the user gaze does not move for a predetermined time or longer, the scan time determiner 135 may determine scan signals to be input to all the gate lines disposed on the display panel 100 as a preset fixed time.

In other words, when it is detected that the head position is fixed (or static), the scan times of the scan signals Scan1, Scan2, Scan3, . . . , Scan N−2, Scan N−1, and Scan N of the turn-on level applied to the gate lines GL between the two vertical synchronization signals Vsync may be fixed to xμs as preset. Here, xμs may correspond to, e.g., a scan time of a scan signal generally set in a display device of 120 Hz.

Figure 7B:
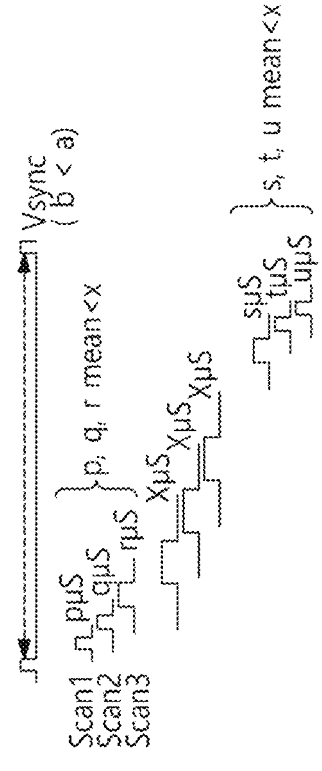
Figure 7B:
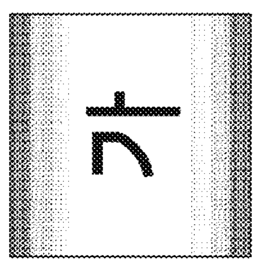
Figure 7B:
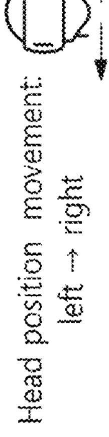

Referring to FIG. 7B, when the user gaze is determined as toward an area corresponding to a central portion of the display panel 100 by the user gaze determiner 310, the area divider 330 may determine the central portion of the display panel 100 as the main field-of-view area and determine as the peripheral field-of-view area the upper and lower portions of the display panel 100.

According to an embodiment, as illustrated in FIG. 7B, when the main field-of-view area is determined as the central portion of the display panel 100 and the peripheral field-of-view area is determined as the upper portion and the lower portion of the display panel 100, the scan time determiner 135 may determine the scan time of the scan signal to be xμs for gate lines GL disposed in the area corresponding to the central portion of the display panel 100, and may determine the scan time of the scan signal to be rμs, qμs, and pμs ($x>r>q>p$) for gate lines GL disposed in the area corresponding to the upper portion of the display panel 100 (the peripheral field-of-view area) to decrease as the distance from the main field-of-view area increases.

Similarly, the scan time determiner 135 may determine the scan time of the scan signal to be sμs, tμs, and uμs ($x>s>t>u$) for the gate lines GL disposed in the area (peripheral field-of-view area) corresponding to the lower portion of the display panel 100 to decrease as the distance from the main field-of-view increases. Here, $r=s$, $q=t$, and $p=u$. The mean of p, q, and r may be smaller than x, and the mean of s, t, and u may be smaller than x.

Figure 7C:
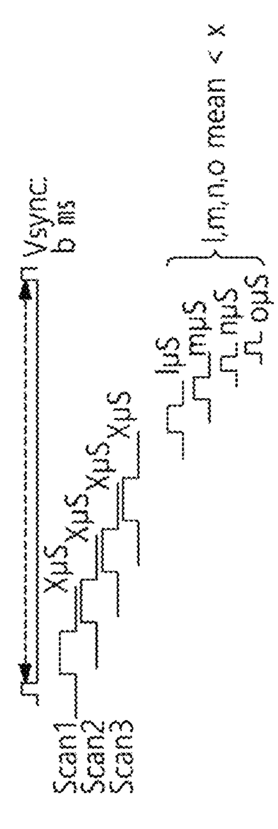
Figure 7C:
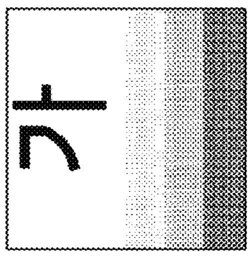
Figure 7C:
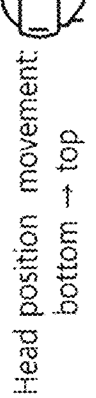

Referring to FIG. 7C, when the user gaze is determined as toward the area corresponding to the upper portion of the display panel 100 by the user gaze determiner 310, the area divider 330 may determine as the main field-of-view area the upper portion of the display panel 100 and determine as the peripheral field-of-view area the lower portion of the display panel 100.

According to an embodiment, as illustrated in FIG. 7C, when the main field-of-view area is determined as the upper portion of the display panel 100 and the peripheral field-of-view area is determined as the lower portion of the display panel 100, the scan time determiner 135 may determine the scan time of the scan signal to be xμs for gate lines GL disposed in the area corresponding to the upper portion of the display panel 100, and may determine the scan time of the scan signal to be lμs, mμs, nμs, oμs ($x>l>m>n>o$) for gate lines GL disposed in the area corresponding to the lower portion of the display panel 100 (the peripheral field-of-view area) to decrease as the distance from the main field-of-view area increases. The mean of l, m, n, and o may be smaller than x.

Figure 7D:
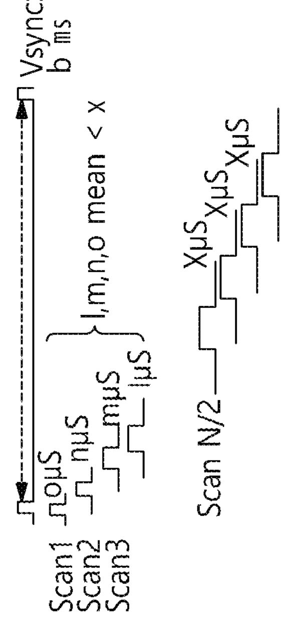
Figure 7D:
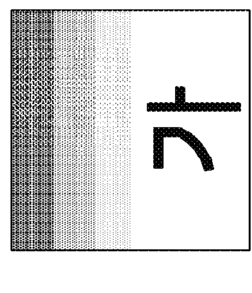
Figure 7D:

Referring to FIG. 7D, when the user gaze is determined as toward the area corresponding to the lower portion of the display panel 100 by the user gaze determiner 310, the area divider 330 may determine as the main field-of-view area the lower portion of the display panel 100 and determine as the peripheral field-of-view area the upper portion of the display panel 100.

According to an embodiment, as illustrated in FIG. 7D, when the main field-of-view area is determined as the lower portion of the display panel 100 and the peripheral field-of-view area is determined as the upper portion of the display panel 100, the scan time determiner 135 may determine the scan time of the scan signal to be xμs for gate lines GL disposed in the area corresponding to the lower portion of the display panel 100, and may determine the scan time of the scan signal to be lμs, mμs, nμs, oμs ($x>l>m>n>o$) for gate lines GL disposed in the area corresponding to the upper portion of the display panel 100 (the peripheral field-of-view area) to decrease as the distance from the main field-of-view area increases. The mean of l, m, n, and o may be smaller than x.

According to an embodiment of the disclosure, user gaze information according to user movement information obtained from a motion sensor may be determined, and the movement of the user gaze may be reflected to the screen in real time.

In other words, techniques of the disclosure may divide the display into a main field-of-view area and a peripheral field-of-view area and determine different scan times for the scan signals corresponding to the main field-of-view area and the peripheral field-of-view area, thereby reducing power consumption of the display panel as compared with when driving at a uniform scan time of the front surface of the display panel.

Further, according to an embodiment of the disclosure, it is possible to reduce motion sickness which is inconvenience due to a mismatch between the user's movement in the virtual environment and the real movement by outputting image data in the main field-of-view area and the peripheral field-of-view area of the display panel at different speeds.

Figure 8:
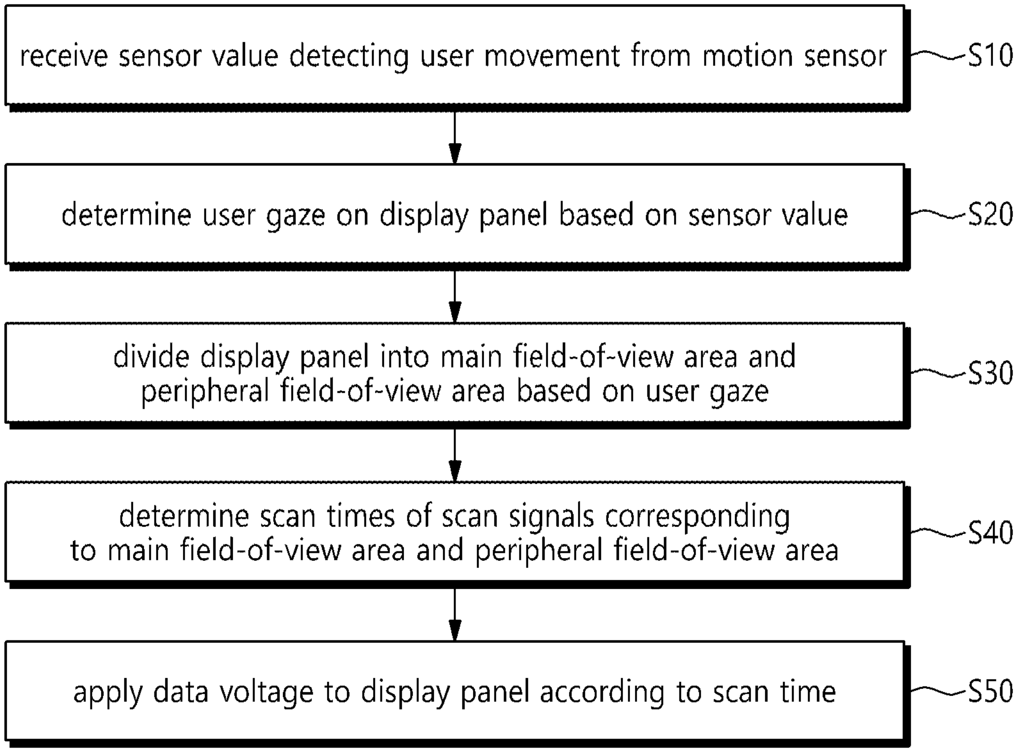
FIG. 8 is a flowchart illustrating an image display method of a display device according to an embodiment of the disclosure.

FIG. 8 is a flowchart illustrating an image display method of a display device according to an embodiment of the disclosure. Hereinafter, a detailed description of parts having the same structure and role of the disclosure as described with reference to FIGS. 1 to 7 is omitted.

Referring to FIG. 8, an image display method of a display device according to an embodiment of the disclosure may include receiving a sensor value detecting a user movement from a motion sensor (S10), determining a user gaze on a display panel based on the sensor value (S20), dividing the display panel into a main field-of-view area and a peripheral field-of-view area of the user based on the determined user gaze (S30), determining scan times of scan signals corresponding to the main field-of-view area and the peripheral field-of-view area (S40), and applying a data voltage to the display panel according to the determined scan times (S50).

The above-described display device according to embodiments of the disclosure may be briefly described again below.

A display device according to an embodiment of the disclosure may comprise a display panel displaying an input image on a screen, a user gaze determiner determining a user gaze on the display panel based on a sensor value obtained from a motion sensor, an area divider dividing the display panel into the user's main field-of-view area, peripheral field-of-view area, and outer area based on the determined user gaze, a scan time determiner determining scan times of scan signals corresponding to the main field-of-view area and the peripheral field-of-view area, and a data driver applying a data voltage to the display panel according to the determined scan time.

When the user gaze is determined as an area corresponding to an upper portion of the display panel by the user gaze determiner, the area divider may determine the main field-of-view area as the upper portion of the display panel, and determines the peripheral field-of-view area as a lower portion of the display panel.

When the user gaze is determined as an area corresponding to a lower portion of the display panel by the user gaze determiner, the area divider may determine the main field-of-view area as the lower portion of the display panel, and determines the peripheral field-of-view area as an upper portion of the display panel.

When the user gaze is determined as an area corresponding to a central portion of the display panel by the user gaze determiner, the area divider may determine the main field-of-view area as the central portion of the display panel, and determines the peripheral field-of-view area as an upper portion and a lower portion of the display panel.

The scan time determiner may determine a scan time corresponding to the main field-of-view area and a scan time corresponding to the peripheral field-of-view area to be different from each other.

The scan time determiner may determine a scan time corresponding to the main field-of-view area to be longer than a scan time corresponding to the peripheral field-of-view area.

The scan time determiner may gradually reduce scan times of scan signals corresponding to the peripheral field-of-view area as a distance from the main field-of-view area increases.

The mean of the scan times of the scan signals corresponding to the peripheral field-of-view area may be smaller than the scan time of the main field-of-view area.

When it is determined by the user gaze determiner that the user gaze is fixed for a predetermined time or more, the scan time determiner may determine the scan signals as a preset fixed time for the entire display panel.

The display panel may be disposed in a virtual reality (VR) system or an augmented reality (AR) system.

An image display method of a display device according to an embodiment of the disclosure may comprise receiving a sensor value detecting a user movement from a motion sensor, determining a user gaze on a display panel based on the sensor value, dividing the display panel into the user's main field-of-view area and peripheral field-of-view area based on the determined user gaze, determining scan times of scan signals corresponding to the main field-of-view area and the peripheral field-of-view area, and applying a data voltage to the display panel according to the determined scan times.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope. The scope of protection of the disclosure should be construed based on the following claims, and all technical ideas within the scope of equivalents thereof should be construed as being included within the scope of the disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel configured to display an input image on a screen;

a user gaze determiner configured to determine a user gaze on the display panel based on a sensor value obtained from a motion sensor;

an area divider configured to divide the display panel into a main field-of-view area and a peripheral field-of-view area based on the determined user gaze;

a scan time determiner configured to determine a scan time of a scan signal corresponding to the main field-of-view area and a scan time of a scan signal corresponding to the peripheral field-of-view area; and a data driver configured to apply a data voltage to the display panel according to the determined scan time, wherein a width of a turn-on level of the scan signal corresponding to the main field-of-view area is different from a width of a turn-on level of the scan signal corresponding to the peripheral field-of-view area, wherein in response to it is determined by the user gaze determiner that the user gaze is fixed for a threshold time or more, the scan time determiner is configured to determine scan signals to have a same scan time for the entire display panel.

2. The display device of claim 1, wherein in response to the user gaze is determined as an area corresponding to an upper portion of the display panel by the user gaze determiner, the area divider is configured to determine the upper portion of the display panel as the main field-of-view area as, and determine a lower portion of the display panel as the peripheral field-of-view area.

3. The display device of claim 1, wherein in response to the user gaze is determined as an area corresponding to a lower portion of the display panel by the user gaze determiner, the area divider is configured to determine the lower portion of the display panel as the main field-of-view area, and determine an upper portion of the display panel as the peripheral field-of-view area.

4. The display device of claim 1, wherein in response to the user gaze is determined as an area corresponding to a central portion of the display panel by the user gaze determiner, the area divider is configured to determine the central portion of the display panel as the main field-of-view area, and determine an upper portion and a lower portion of the display panel as the peripheral field-of-view area.

5. The display device of claim 1, wherein the scan time determiner is configured to determine a scan time corresponding to the main field-of-view area and a scan time corresponding to the peripheral field-of-view area to be different from each other.

6. The display device of claim 1, wherein the scan time determiner is configured to determine a scan time corresponding to the main field-of-view area to be longer than a scan time corresponding to the peripheral field-of-view area.

7. The display device of claim 1, wherein the scan time determiner is configured to reduce a scan time of a scan signal corresponding to the peripheral field-of-view area as a distance between the peripheral field-of-view area and the main field-of-view area increases.

8. The display device of claim 7, wherein a mean of scan times of scan signals corresponding to the peripheral field-of-view area is smaller than the scan time of the main field-of-view area.

9. The display device of claim 1, wherein the display panel is disposed in a virtual reality (VR) system or an augmented reality (AR) system.

10. An image display method, comprising:

receiving a sensor value of a user movement detected by a motion sensor;

determining a user gaze on a display panel based on the sensor value;

dividing the display panel into a main field-of-view area and a peripheral field-of-view area based on the determined user gaze;

determining a scan time of a scan signal corresponding to the main field-of-view area and a scan time of a scan signal corresponding the peripheral field-of-view area; and applying a data voltage to the display panel according to the determined scan time, wherein in response to it is determined that the user gaze is fixed for a threshold time or more, scan signals are configured to have a same scan time for the entire display panel.

11. A display device, comprising:

a display panel including a plurality of sub-pixels;

a motion sensor configured to determine a movement of a user with respect to the display panel;

a controller communicatively coupled to the motion sensor, the controller configured to:

determine a user gaze at the display panel based on movement information of the user detected by the motion sensor; and divide the display panel into a main field-of-view area and a peripheral field-of-view area based on the determined user gaze, wherein the main field-of-view area in which at least one first sub-pixel among the plurality of sub-pixels is disposed is configured to have a first luminance level and the peripheral field-of-view area in which at least one second sub-pixel among the plurality of sub-pixels is disposed is configured to have a second luminance level different from the first luminance level, and wherein a first scan pulse width corresponding to the at least one first sub-pixel in the main field-of-view area is different from a second scan pulse width corresponding to the at least one second sub-pixel in the peripheral field-of-view area.

12. The display device of claim 11, wherein the second luminance level is lower than the first luminance level.

13. The display device of claim 11, comprising a third sub-pixel in the peripheral field-of-view area, the third sub-pixel further from the main field-of-view area than the second sub-pixel, and the controller is configured to control the third sub-pixel to have a third luminance level that is lower than the second luminance level.

14. The display device of claim 11, wherein the first sub-pixel includes a first storage capacitor, and the second sub-pixel includes a second storage capacitor;

the controlling the first sub-pixel to have the first luminance level includes controlling to charge the first storage capacitor for the first scan pulse width; and the controlling the second sub-pixel to have the second luminance level includes controlling to charge the second storage capacitor for the second scan pulse width.

15. The display device of claim 14, wherein the second scan pulse width is smaller than the first scan pulse width.

16. The display device of claim 11, wherein the motion sensor includes one or more of a gyroscope or an accelerometer.

17. The display device of claim 11, wherein the motion sensor is configured to detect one or more of a head movement, a body movement, or an eye ball movement of the user.

18. The display device of claim 11, wherein the controller is configured to determine an area of the display where the user gaze is at as the main field-of-view area.

19. The display device of claim 11, wherein in response to determining that the user gaze have been fixed for a threshold time, the controller is configured to control the first sub-pixel and the second sub-pixel to have a same luminance level.

* * * * *